United States Patent [19]

Galante

[11] Patent Number: 5,244,311
[45] Date of Patent: Sep. 14, 1993

[54] METHOD FOR INCREASING THE CAPACITY OF AN ACTIVE LANDFILL

[75] Inventor: Vito N. Galante, Feasterville, Pa.

[73] Assignee: Waste Management of North America, Inc., Oak Brook, Ill.

[21] Appl. No.: 893,275

[22] Filed: Jun. 4, 1992

[51] Int. Cl.$^5$ .............................................. B09B 1/00
[52] U.S. Cl. ...................................... 405/129; 404/82; 404/133.05; 405/128; 405/258; 405/271
[58] Field of Search ............... 405/129, 128, 271, 258; 404/82, 75, 102, 117, 133.05

[56] References Cited

U.S. PATENT DOCUMENTS

| | | | |
|---|---|---|---|
| 1,650,827 | 11/1927 | Friz | 405/271 |
| 3,352,115 | 11/1967 | Jurisich | 405/271 X |
| 3,446,026 | 5/1969 | Fikse . | |
| 3,478,656 | 11/1969 | McDonald | 405/271 X |
| 3,511,056 | 5/1970 | Jones et al. . | |
| 3,614,867 | 10/1971 | Nieman | 405/271 X |
| 3,621,659 | 11/1971 | Anderson et al. | 405/271 |
| 3,705,851 | 12/1972 | Brauer | 405/129 X |
| 3,835,652 | 9/1974 | Hignite | 405/129 |
| 3,898,844 | 8/1975 | Menard | 405/271 |
| 4,270,875 | 6/1981 | Kainuma . | |
| 4,838,733 | 6/1989 | Katz . | |

FOREIGN PATENT DOCUMENTS

| | | | |
|---|---|---|---|
| 2629846 | 10/1989 | France | 405/271 |
| 2125856 | 3/1984 | United Kingdom | 405/271 |

OTHER PUBLICATIONS

Article entitled: "An Assessment of Deep Dynamic Compaction as a Means to Increase Refuse Density for an Operating Municipal Waste Landfill", Vito N. Galante et al, published during a conference held on Jul. 10–11, 1991.
Article Entitled "Dynamic Compaction for Highway Construction", vol. 1, Design and Construction Guidelines, U.S. Dept. of Transportation, Luka R. G. (1986).
Article entitled "Dynamic Deep Compaction of Sanitary Landfill to Support Super Highway", Proc. 8th European Conference on SMFE, Helsinki, 1, 319,321, Welsh J. P. (1983).
Article entitled "Field Measurements of Dynamic Moduli and Poisson's Ratios of Refuse and Underlying Soils at a Landfill Site", Geotechnics of Waste Fills, ASTM Special Technical Publication 1070, 57–70, Sharma et al. (1990).
Article entitled "Geotechnics of Waste Fill", Geotechnics of Waste Fills, ASTM Special Technical Publication 1070, 57–70, Landva et al, (1990).
Article entitled "Settlement of Recently Placed Domestic Refuse Landfill", Proc. Istm, Civ. Engrs., Part I, Watts et al, 1990, 88, 971–993.
Letter authored by A. Eith and V. Galante dated Jun. 5, 1190 addressed to the Department of Einvironmental Resources, Bureau of Waste Management, Commonweath of Pennsylvania.
"The Stockley Park project", D. L. Gordon et al., Proc. Instm. Civ. Engrs. Conf. on Building on Marginal and Derelict Land, Glasgow, Thomas Telford, 359–379.

Primary Examiner—Dennis L. Taylor
Attorney, Agent, or Firm—Allegretti & Witcoff, Ltd.

[57] ABSTRACT

A method of increasing the available capacity of an active above ground and/or incised landfill is disclosed that involves dynamically compacting successive layers of deposited refuse. This method increases the available volume of the landfill up to about 20 percent without damaging the liner system that protects the surrounding soil base and ground water.

8 Claims, 2 Drawing Sheets

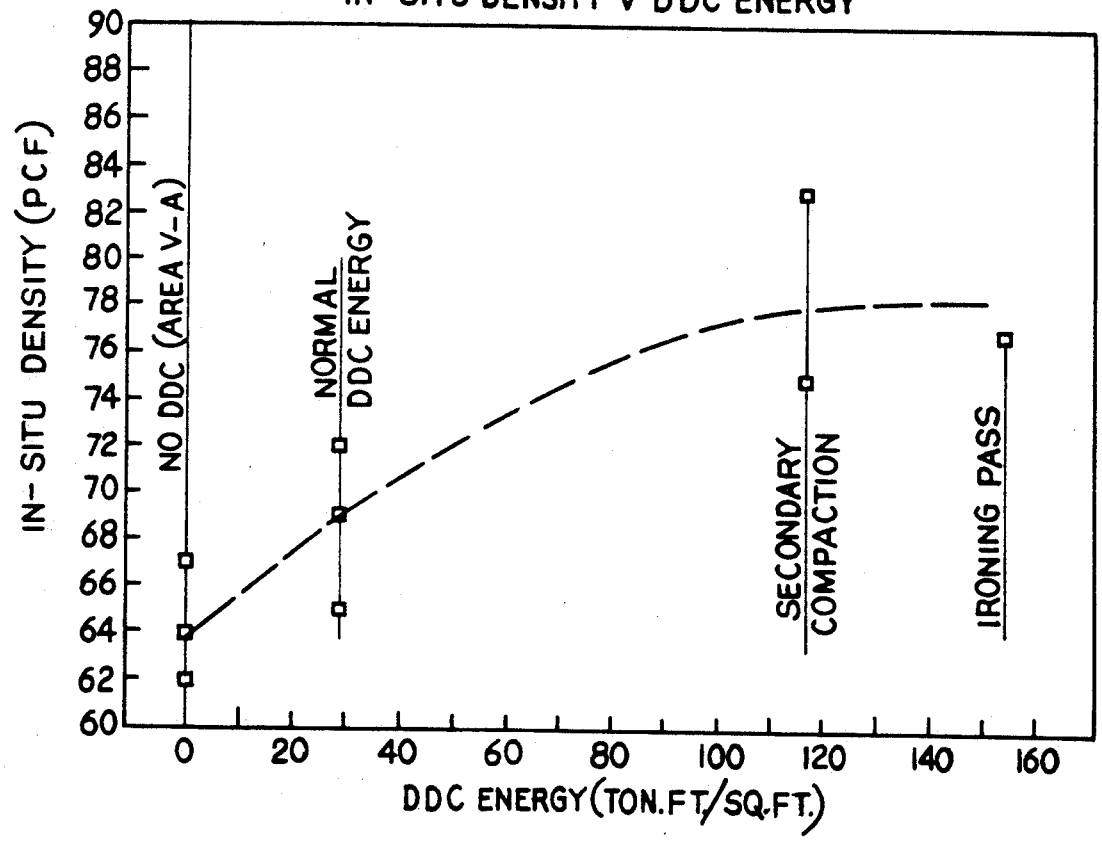

METHOD FOR INCREASING THE CAPACITY OF AN ACTIVE LANDFILL

FIELD OF INVENTION

The present invention relates generally to the disposal of garbage and refuse and pertains, more specifically, to increasing the capacity of an active landfill to accommodate greater volumes of garbage, refuse or trash within the limits of available landfill areas.

BACKGROUND OF THE INVENTION

It has long been the practice to dispose of garbage, refuse, trash and like matter in landfills located in areas designated specifically for that purpose. More recently, the availability of areas for landfills has diminished quite drastically, presenting acute problems in the disposal of garbage and like matter. In addition government regulations in most parts of the United States now require that new landfills be constructed with liners, membranes, films or other covering systems that isolate and protect the soil and ground water beneath bottom of the landfill from contamination by the refuse and its associated leachate. A primary concern of landfill operation is the preservation of the integrity of such liners or covering systems. In an effort to maximize the volume capacity of an active landfill several methods of compaction of the refuse have been tried.

The conventional method of compacting active landfills is through the use of a static compactor as described in U.S. Pat. No. 3,614,867 (Nieman). Static compaction is accomplished by the repeated rolling of a heavy wheeled vehicle having smooth, spiked or cleated rollers to break down and compact a layer of refuse. However, such wheeled static compactors are limited in the degree of compaction obtained by the weight of the wheeled vehicle and/or spiked roller. Compaction of refuse below the surface of a landfill using complicated machinery has been described in U.S. Pat. Nos. 3,466,026 (Fikse) and 3,511,056 (Jones et al.). Another below ground method of compacting refuse is described in U.S. Pat. No. 3,835,652 (Hignite), where a plurality of large vertical holes are drilled into firm soil. Refuse is then dumped into the holes and then hammered into a tight slug, before eventually being covered with a soil cap.

Unrelated to refuse disposal or the maintenance of active landfills, is the known general method of compacting earth in preparation for placing structures, such as buildings, roads, railways and the like. U.S. Pat. No. 1,650,827 (Friz) describes compaction of earth by successive vertical drops of a weighted hammer. Similar methods of compacting earth in preparation for the eventual construction of roadways, buildings and other structures has been accomplished using the weighted hammer method. Such techniques are described in two articles, Lukas, R. G. (1986), *Dynamic Compaction For Highway Construction*, Vol. 1; Design and Construction Guidelines, U.S. Department of Transportation and Welsh, J. P. (1983), *Dynamic Deep Compaction of Sanitary Landfill To Support Super Highway*, Proc. 8th European Conference on SMFE, Helsinki, 1, 319–321.

Although the need to increase the capacity of active landfills has been recognized, the art has not described or suggested a method to enhance the volume of an above ground and/or incised active landfill using a dynamic compaction method while preserving the integrity of the liner or covering system.

SUMMARY OF THE INVENTION

The present invention provides a method by which the capacity of an active landfill can be increased dramatically through dynamic compaction of an active above ground and/or incised landfill over very large areas, as compared to previous static compaction techniques. Following the methods of this invention dynamic compaction will not damage the integrity of the liner or covering system that protects the surrounding soil and/or ground water from contamination by the refuse and its associated leachate.

It is an object of this invention to provide an economical method to increase the capacity of an active landfill without increasing the area occupied by the landfill, while simultaneously preserving the integrity of the liner or covering system.

Another object of this invention is provide a method to achieve up to approximately 20% increase in the volume of the landfill and thus dramatically increasing the operational life span of the landfill.

Yet another object of this invention is to provide a rapid compaction method that does not interfere with or delay the normal refuse filling procedures.

Still another object is to provide a dynamic compaction method that will result in a more stable landfill embankment because of increased refuse densities and ultimately result in reduced long term settlement of the landfill which will significantly reduce post-closure maintenance and costs.

Accordingly, a broad embodiment of the invention is directed to a method for increasing the capacity of an active landfill comprising the steps of installing a liner having lower and upper surfaces in an empty landfill; adding a buffer layer of refuse to the upper surface of the liner; adding a next layer of refuse to the buffer layer and compacting the next layer using a static compactor to form a compacted surface; dynamically compacting the next compacted surface, without damaging the liner, by repeated dropping of a weight in a predetermined pattern forming print craters; grading the print craters to form a graded surface, adding a subsequent layer of refuse to the graded surface, and compacting the subsequent layer using the static compactor; dynamically compacting the subsequent layer of refuse; and repeating the steps of adding and compacting layers of refuse until the landfill is filled to capacity.

This as well as other embodiments of the present invention will become evident from the following, more detailed description of certain preferred embodiments.

BRIEF DESCRIPTION OF THE DRAWINGS

The accompanying drawings illustrate preferred embodiments of the invention. Specifically.

FIG. 4 is a graphical representation of the relationship between dynamic compaction energy input and the density achieved by dynamic compaction.

DETAILED DESCRIPTION OF PREFERRED EMBODIMENTS

Figure 1:
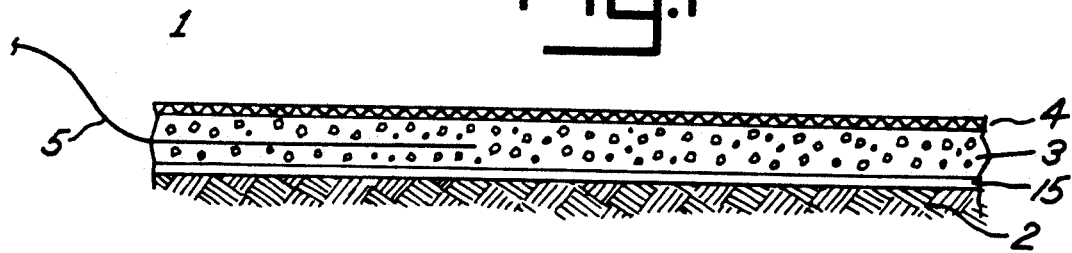
FIG. 1 is a diagrammatic, pictorial cross-sectional view of a portion of a new, unfilled landfill with a liner and leachate collection system in place.

The invention will be understood more fully by reference to the drawings and especially to FIG. 1 which shows a cross-sectional portion of an empty landfill site 1 after the addition of a leachate collection zone 3, a leachate monitoring device 5, a primary liner 4 and a secondary liner 15. The term "liner" as used herein can be any system of coverings to effectuate a seal between the soil base of the landfill 2 and the refuse that is eventually deposited within the landfill. Although only two liners are shown in FIG. 1, it is common to install multiple layers of various synthetic materials to provide the required seal. Examples of such materials include geomembranes, very low density polyethylene, mesh or textured materials, natural materials such as clay, and combinations of these. Preferred liners are those constructed of high density polyethylene (HDPE).

Installation of the liner can follow any accepted method known in this art, provided that the integrity of the liner is maintained and the soil base 2 of the landfill is effectively isolated from the deposited refuse and associated leachate typically formed during filling of a sanitary landfill. To monitor the integrity of the primary liner 4 during the filling of the landfill, a leachate monitoring device 5 is installed below the primary liner. This monitoring system allows for determination of the quantity of leachate, if any, escaping or leaking through the primary liner 4. In addition, the monitoring device can provide a means to remove leachate, if any, for ultimate treatment and disposal.

In some instances it may be desirable to install strain gauges directly onto the surface of the primary liner in order to monitor the integrity of the liner during the filling of the landfill with refuse. Any type of strain gauge system may be used, however, a preferred type is an electrical resistant strain gauge that is capable of providing a continuous readout of the strain being experienced by the liner system.

Figure 2:
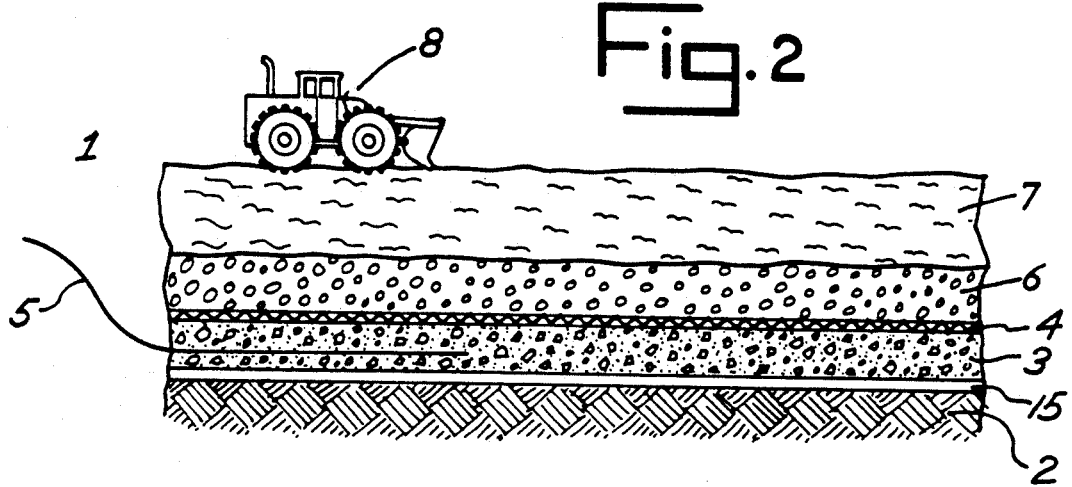
FIG. 2 is a cross-sectional view of the landfill, after addition of a buffer layer of refuse and a subsequent layer of refuse, where the subsequent layer is being compacted using a static compactor.

Once the liner is installed, a buffer layer of refuse 6 is added to the landfill as illustrated in FIG. 2. As used herein, the term "refuse" means any type of nonhazardous solid or semisolid waste that is typically placed in a sanitary landfill, for example, municipal solid wastes, municipal sewage sludges, residual (nonhazardous industrial) wastes, contaminated soils, ash, flue dust, asbestos, and various combinations of these materials. A layer of fill material, such as gravel or other type of aggregate material, is added directly upon the upper surface of the liner before the addition of the buffer layer of refuse. This fill material can act as a collection system for leachate to facilitate its ultimate removal from the landfill. The refuse is typically brought or delivered to the landfill by truck, however, this invention is not limited to the actual mode of transportation used to deliver the refuse. The addition of the buffer layer 6 of refuse is critical to this invention because it is the layer of refuse closest to the primary liner. Great care must be taken when adding the buffer layer 6 to the landfill, and in most cases requires reorientation or even removal of objects that upon compaction could potentially puncture or otherwise damage the integrity of the primary liner 4. It is important that the buffer layer 6 be of sufficient depth to provide a safety zone between the primary liner and subsequent layers of refuse. I have found that the buffer layer should be at a minimum of 8 feet in depth to provide for adequate protection of the liner.

Once the buffer layer of refuse is in place, it can be vertically compacted using a static compactor 8, however, in most instances it is desirable to forego static compaction until a next layer of refuse is added to the buffer layer. Static compaction is accomplished by conventional landfill compactors, dozers or other heavy equipment which include heavy wheeled vehicles, commonly referred to as a "sheep foot" compactor, an example of which is illustrated in FIG. 2. The conventional landfill compactor compacts the refuse by repeated rolling over the landfill area with heavy cleated wheels or rollers. Static compaction can be accomplished simultaneously with the addition of the buffer layer 6 and all subsequent layers of refuse, for example, during the grading of the refuse after it has been dumped and/or delivered to the landfill. Static compaction of the buffer layer 6 is preferably not performed because damage to the primary liner 4 could result, thus destroying the seal that prevents contamination of the soil base 2 and ground water by the refuse and leachate. Depending on the location of the landfill, and the government regulations relating to such landfills, a daily cover of soil or an alternative natural or synthetic material, may be added to the refuse at the end of each working day. Whether or not a daily cover is used has no material impact on the benefits achieved by this invention.

Figure 3:
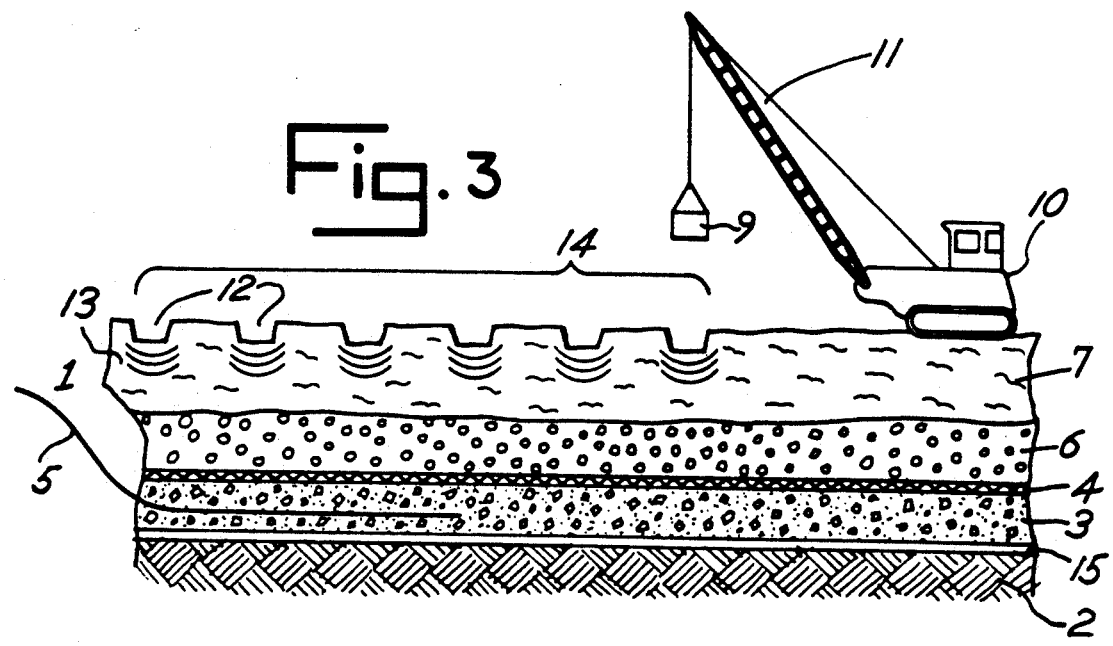
FIG. 3 is a cross-sectional view of the landfill undergoing dynamic compaction following a predetermined grid pattern forming print craters.

Referring now to FIG. 3, a next layer of refuse 7 is added directly to the buffer layer 6. The next layer of refuse 7 varies in depth, being dependent upon the depth of the buffer layer. The object is to have the combination of the buffer layer 6 and next layer 7 be of sufficient depth to ensure that the dynamic compaction technique, as described below, does not damage the integrity of the primary liner 4. This next layer 6 is typically formed by the addition of successive layers of refuse subsequently added to the buffer layer 6, with each being added in depths of from about 8 to about 10 feet. Each of these subsequent layers of refuse is statically compacted using the static compactor.

Dynamic compaction is not begun until at least about 20 feet, more preferably about 30 feet of refuse has been deposited above the upper surface of the primary liner 4. This minimum depth of refuse includes the buffer layer 6 and all subsequent layers of refuse added thereto.

Again referring to FIG. 3, the technique of dynamically compacting the refuse comprises the repeated dropping of a heavy weight 9 from a substantial height onto the upper surface of a statically compacted layer of refuse following a predetermined grid pattern 14. A preferred technique to perform the dynamic compaction involves using a crane 10 with boom 11 of substantial length to achieve an elevation of at least 50 feet. The weight 9 can be constructed of any material that provides for an effective surface area of impact, preferably at least 25 square feet, and weighing at a minimum 5 tons, most preferably in the range of 10 to 20 tons.

Prior to beginning dynamic compaction, however, the top surface of the most recently added subsequent layer of refuse must be compacted using the static compactor. This is necessary in order to prevent several undesirable side effects of the dynamic compaction technique, such as, heaving of the refuse around the point of impact of the weight. Another side effect is over penetration of the weight into the layer of refuse which makes the weight difficult to remove from the refuse and can result in damage to the crane.

A most preferred technique used to perform the dynamic compaction involves using a crawler crane with a 120 foot boom having suspended therefrom a weight rectangular in shape measuring at least 6 feet by 6 feet, and weighing at least 10 tons. The weight is dropped in free fall fashion, from a height of at least 50 feet, most preferably at least 70 feet, measured from the surface of the refuse. Repeated drops of the weight on approximately the same point of impact creates what is known as a "print" or "print crater" 12. Repeated drops at the same location is required to sufficiently compact and densify the refuse so as to achieve an increase in the landfill volume available so subsequent layers of refuse can be added. Using the method of my invention can result in volume increases, as compared to conventional landfilling techniques, of from about 5 to about 20 percent without damaging the integrity of the primary liner 4. Although many factors influence the degree of compaction possible, such as, the type of refuse, moisture level, height of the drop, size of the weight dropped and the grid pattern followed, I have found that a minimum of 5 drops per print 12 is sufficient using a predetermined print grid pattern having print spacings of at least 10 feet, more preferably at least 12 feet, measured from center to center of each print. A densified area of refuse 13 is created below each print crater 12 in the grid pattern 14. It is important to predetermine the print grid pattern before dynamic compaction is begun in order to effectively utilize the crane and the available surface of the landfill to be compacted. A preferred approach is to use a grid pattern that matches the shape of the available landfill area, e.g., for a rectangular shaped landfill, use a square grid pattern, for oval shaped landfills, use an oval grid patter, and so on. The grid pattern selected should avoid the outer edges of the landfill because the dynamic compaction technique could damage the integrity of the graded slopes of the landfill, thus resulting in the formation of weak embankments.

Another important aspect of predetermining the grid pattern 14 is to allow for careful planning of the progress of the repeated drops so as not to delay or interfere with the ongoing procedures of filling the landfill. In other words, the grid pattern is planned to avoid interrupting the delivery and dumping of the refuse.

After the predetermined grid pattern has been dynamically compacted, the print crators 12 are graded using conventional wheeled grading equipment to prepare the surface of the refuse for subsequent layers of refuse. For each subsequent layer of refuse having a depth of from about 8 to about 10 feet, the following procedure is repeated until the landfill is filled to capacity:
a) statically compacting the surface using a static compactor;
b) dynamically compacting the compacted surface following a predetermined grid pattern forming print craters; and
c) grading the print craters before the next layer of refuse is added.

In order to more fully demonstrate the attendant advantages arising from the present invention the following example is presented. It is to be understood that the above described embodiments and the following example are provided by way of example only and are not intended as an undue limitation on the otherwise broad scope of the invention. Various details of the method or design of the equipment used in performing the invention may be modified without departing from the true spirit and scope of the inventions set forth in the appended claims.

EXAMPLE

A full scale trial of this invention was conducted at an active landfill facility located outside of Philadelphia, Pa. A complete description of this full scale trial is described in a paper entitled, *An Assessment of Deep Dynamic Compaction as a Means to Increase Refuse Density for an Operating Municipal Waste Landfill*, by Vito N. Galante, et al., made available for publication by the Midland Geotechnical Society during a conference held on Jul. 10 and 11, 1991, in the United Kingdom, the details of which are incorporated herein by reference. The landfill site was constructed above ground, overlying mixed alluvial sediment and covered an area of approximately 4 hectares and was divided into two separate cells, designated Area V-a and Area V-b. Area V-a was landfilled by conventional methods, as a control area, while Area V-b was landfilled following the method of this invention. Both areas were constructed with a doubled lined containment system comprising high density polyethylene (HDPE) synthetic primary and secondary liners including a leachate collection system installed in a gravel layer above the primary liner. A leachate monitoring system was also installed below the primary liner to monitor and evaluate the primary liner integrity during the landfilling operations.

To evaluate the possible adverse affects that the methods of this invention might have on the liner system, strain gauges were installed on the liners of areas V-a and V-b, and were monitored throughout the project. Linear strain instrumentation consisted of 40 electrical resistant strain gauges, 20 in each of the areas.

The type of refuse used to fill Areas V-a and V-b had the following approximate composition.

| | |
|---|---|
| Municipal solid waste | 79% |
| Municipal solid sludge | 16% |
| Miscellaneous, nonhazardous wastes | 5% |

Placement of the refuse in each cell area commenced with an initial buffer layer of refuse measuring approximately 8 feet in depth with care being taken to remove or reorient any objects that could potentially damage the liner. After addition of the buffer layer of refuse, subsequent layers of refuse were placed in each of the two areas within the landfill, each subsequent layer being between 8 to 10 feet in depth.

At the point where the total amount of refuse in Area V-b reached a depth of approximately 30 feet measured from the surface of the primary liner system, dynamic compaction was begun. A Manitowoc 4100 crawler crane with a 120 foot boom, a 10 ton steel weight, measuring 7 feet by 7 feet was initially used. The weight was suspended on a single line, allowing for virtual free-fall conditions to be achieved for maximum compactive effect. Initially 5 drops from 70 feet following a predetermined rectangular grid pattern produced print craters spaced approximately 14 feet from center to center. As the project proceeded the weight was switched to a 15 ton weight comprised of steel and concrete, and measuring 6 by 6 feet. The grid pattern was also redesigned to decrease the spacing between print craters to 12 feet. All other parameters were kept constant.

Static wheeled compactors were used to grade the print craters after in Area V-b dynamic compaction and before the next layer of refuse was added. As each new layer of refuse was added to Areas V-a and V-b, static compactors were used to grade and statically compact the refuse. In Area V-b, dynamic compaction was performed following static compaction. Only static compaction was performed in Area V-a. At no point in the project was the delivery or procedures relating to the dumping of refuse interrupted or delayed as a result of the dynamic compaction procedure.

At one point during the project in Area V-b as time constraints relaxed, the grid pattern was further reduced to allow for additional drops to increase the number of print craters formed. This increased number of drops was referred to as "secondary compaction". In addition, at one point in time during the project the weight was dropped on a very close overlapping pattern, referred to as a "ironing pass". This was done to evaluate how the grid pattern selected and followed affected the ultimate density of the refuse.

Refuse densities within the control Area V-A, and in Area V-b, were measured by in-situ tests. These tests involved the excavation of a pit approximately 6 feet deep and as regular in shape as possible within the compacted refuse. The excavated refuse was loaded into a previously weighed truck and reweighed. The pit was immediately lined with a geotextile material and then filled with water while monitoring the volume of water to fill the pit. Based on the weight of refuse excavated and the total volume of water to fill the pit, densities were calculated. As illustrated in FIG. 4, there is an optimum energy input level above which little further density improvement is achieved. This level appears to be around 100 ton ft./sq. ft. and corresponds to an in-place density of approximately 78 pcf or a "compaction factor" of around 2.9. In volumetric terms this would correspond to an overall airspace gain on the order of 20 percent. The actual volumetric increase actually observed for Area V-b was approximately 8%. Based on the data obtained during the project and considering that the size of test Area V-b was much smaller than would actually be used in an active landfill, it is expected that practical increases in volume of about 15% are likely.

Liner strains in control Area V-a and dynamically compacted Area V-b did not exceed 1%, thus indicating no adverse effect on the liner system due to dynamic compaction. Likewise, monitoring of the secondary leachate collection system showed no increase in the amount of leachate Area V-b as a result of the dynamic compaction procedure.

I claim the following:

1. A method for increasing the capacity of an active landfill comprising, in combination, the steps of,
    (a) installing a liner having lower and upper surfaces in an empty landfill occupying an area of defined shape;
    (b) adding a buffer layer of refuse to the upper surface of the liner;
    (c) adding a next layer of refuse to the buffer layer and compacting the next layer using a static compactor to form a compacted surface;
    (d) dynamically compacting the compacted surface, without damaging the liner, by repeated dropping of a weight in a predetermined pattern forming print craters;
    (e) grading the print craters to form a graded surface, adding a subsequent layer of refuse to the graded surface, and compacting the subsequent layer using the static compactor;
    (f) dynamically compacting the subsequent layer of refuse by following the method of step (d); and
    (g) repeating steps (e) and (f) as the landfill is filled.

2. A method according to claim 1, adding the buffer layer to a depth of at least 8 feet and not compacting before addition of subsequent layers of refuse.

3. A method according to claim 1, grading with the static compactor comprising a vehicle having smooth or cleated wheels and capable of grading refuse.

4. A method according to claim 1, dropping a weight that weighs from about 5 to about 20 tons.

5. A method according to claim 1, dropping a weight from a height of at least 50 feet.

6. A method according to claim 1, forming the predetermined pattern following the defined shape of the landfill and resulting in the formation of print craters spaced at least about 10 feet apart.

7. A method according to claim 1, forming the next layer of refuse to a depth of at least 20 feet as measured from the upper surface of the liner.

8. A method according to claim 7, forming the next layer by layering successive layers of refuse in depths of from about 8 to about 10 feet.

* * * * *